(12) United States Patent
Millar et al.

(10) Patent No.: US 11,473,021 B2
(45) Date of Patent: Oct. 18, 2022

(54) UPGRADING OIL USING SUPERCRITICAL FLUIDS

(71) Applicants: 1304342 Alberta Ltd., Edmonton (CA); 1304338 Alberta Ltd., Edmonton (CA)

(72) Inventors: Mackenzie Millar, Edmonton (CA); Jose Lourenco, Edmonton (CA)

(73) Assignees: 1304338 ALBERTA LTD., Edmonton (CA); 1304342 ALBERTA LTD., Edmonton (CA)

(*) Notice: Subject to any disclaimer, the term of this patent is extended or adjusted under 35 U.S.C. 154(b) by 1079 days.

(21) Appl. No.: 15/781,689

(22) PCT Filed: Dec. 1, 2016

(86) PCT No.: PCT/CA2016/051408
§ 371 (c)(1),
(2) Date: Jun. 5, 2018

(87) PCT Pub. No.: WO2017/096467
PCT Pub. Date: Jun. 15, 2017

(65) Prior Publication Data
US 2020/0165531 A1    May 28, 2020

(30) Foreign Application Priority Data
Dec. 7, 2015    (CA) .................................. CA 2914070

(51) Int. Cl.
*C10G 31/08*    (2006.01)
*B01D 1/00*    (2006.01)
(Continued)

(52) U.S. Cl.
CPC ........... *C10G 31/08* (2013.01); *B01D 1/0058* (2013.01); *C09K 8/592* (2013.01); *C10G 9/36* (2013.01);
(Continued)

(58) Field of Classification Search
CPC ........ E21B 36/04; E21B 43/24; E21B 43/2401; E21B 43/30; E21B 43/243
See application file for complete search history.

(56) References Cited

U.S. PATENT DOCUMENTS 2,446,925 A    8/1948    Hemminger
2,495,613 A    1/1950    Tuttle
(Continued)

FOREIGN PATENT DOCUMENTS

CA    1098852 A1    4/1981
CA    2691392 A1    2/2007
(Continued)

OTHER PUBLICATIONS

International Search Report dated Aug. 26, 2010, issued in International Application No. PCT/CA2010/000530, filed Apr. 7, 2010, 3 pages.
(Continued)

*Primary Examiner* — Zakiya W Bates
(74) *Attorney, Agent, or Firm* — Christensen O'Connor Johnson Kindness PLLC

(57) ABSTRACT

A method of upgrading oil using supercritical fluids generated by a fuel cell. The process uses supercritical carbon dioxide to control the specific gravity of the oil and supercritical water, the amount of which is controlled to achieve a desired oil/water ratio in processing oils to be upgraded. The process recovers the GHG emission stream from a fuel cell anode exhaust to produce supercritical fluids.

36 Claims, 3 Drawing Sheets

(51) Int. Cl.

| | |
|---|---|
| *C09K 8/592* | (2006.01) |
| *C10G 9/36* | (2006.01) |
| *E21B 43/16* | (2006.01) |
| *E21B 43/24* | (2006.01) |
| *E21B 43/40* | (2006.01) |
| *H01M 8/04119* | (2016.01) |
| *H01M 8/0662* | (2016.01) |

(52) U.S. Cl.
CPC ............ *E21B 43/164* (2013.01); *E21B 43/24* (2013.01); *E21B 43/40* (2013.01); *H01M 8/04156* (2013.01); *H01M 8/0662* (2013.01)

(56) References Cited

U.S. PATENT DOCUMENTS

| | | |
|---|---|---|
| 4,094,767 A | 6/1978 | Gifford |
| 4,187,672 A | 2/1980 | Rasor |
| 4,213,826 A | 7/1980 | Eddinger et al. |
| 4,265,736 A | 5/1981 | Thayer |
| 4,306,961 A | 12/1981 | Taciuk |
| 4,323,446 A | 4/1982 | Chervenak et al. |
| 4,404,086 A | 9/1983 | Oltrogge |
| 4,459,201 A | 7/1984 | Eakman et al. |
| 4,561,966 A | 12/1985 | Owen et al. |
| 5,014,785 A | 5/1991 | Puri et al. |
| 5,085,274 A | 2/1992 | Puri et al. |
| 5,093,579 A | 3/1992 | Amemiya et al. |
| 5,133,406 A | 7/1992 | Puri |
| 5,232,793 A | 8/1993 | Miyauchi et al. |
| 5,332,036 A | 7/1994 | Shirley et al. |
| 5,402,847 A | 4/1995 | Wilson et al. |
| 5,536,488 A | 7/1996 | Mansour et al. |
| 6,187,465 B1 | 2/2001 | Galloway |
| 7,550,063 B2 | 6/2009 | Gawad |
| 8,088,528 B2 | 1/2012 | Lourenco et al. |
| 8,585,891 B2 | 11/2013 | Lourenco et al. |
| 9,132,415 B2 | 9/2015 | Lourenco et al. |
| 2003/0022035 A1 | 1/2003 | Galloway |
| 2004/0115492 A1 | 6/2004 | Galloway |
| 2004/0229103 A1 | 11/2004 | Jahnke et al. |
| 2005/0271914 A1 | 12/2005 | Farooque et al. |
| 2006/0159967 A1 | 7/2006 | Huijsmans et al. |
| 2008/0296018 A1 | 12/2008 | Zubrin et al. |
| 2010/0163226 A1 | 7/2010 | Zornes |
| 2011/0094940 A1 | 4/2011 | Weisselberg |
| 2011/0163011 A1 | 7/2011 | Yarbro |
| 2011/0206571 A1 | 8/2011 | Skinner et al. |
| 2012/0251898 A1 | 10/2012 | Lehar et al. |
| 2014/0272617 A1 | 9/2014 | Berlowitz et al. |
| 2014/0338901 A1 | 11/2014 | Sites et al. |
| 2015/0188172 A1 | 7/2015 | Yun et al. |
| 2016/0130513 A1 | 5/2016 | Galloway |

FOREIGN PATENT DOCUMENTS

| | | |
|---|---|---|
| CA | 2 641 747 A1 | 10/2008 |
| CA | 2 515 999 C | 12/2012 |
| CA | 2920656 C | 3/2018 |
| CN | 101498229 A | 1/2008 |
| CN | 102937016 A | 2/2013 |
| GB | 977905 A | 12/1964 |
| GB | 2471862 A | 1/2011 |
| JP | 2006104261 A | 4/2006 |
| JP | 2015-502639 A | 1/2015 |
| WO | 2005/001977 A1 | 1/2005 |
| WO | 2010/115283 A1 | 10/2010 |
| WO | 2011/081665 A1 | 7/2011 |
| WO | 2012/000115 A1 | 1/2012 |
| WO | 2012/092404 A1 | 7/2012 |
| WO | 2013/074875 A2 | 5/2013 |
| WO | 2014/138208 A1 | 9/2014 |
| WO | 2015/059507 A1 | 4/2015 |
| WO | 2015/106820 A1 | 7/2015 |
| WO | 2017/132773 A1 | 8/2017 |
| WO | 2017/189785 A1 | 11/2017 |

OTHER PUBLICATIONS

International Search Report dated Oct. 31, 2011, issued in International Application No. PCT/CA2011/050403, filed Jun. 30, 2011, 3 pages.

International Search Report and Written Opinion dated Feb. 24, 2014, issued in International Application No. PCT/CA2013/050955, filed Dec. 12, 2013, 7 pages.

International Search Report and Written Opinion dated Jun. 20, 2016, issued in International Application No. PCT/CA2015/051022, filed Oct. 8, 2015, 7 pages.

Jacobs Consultancy, "Evaluation of Integrating a Molten Carbonate Fuel Cell (MCFC) With a SADG Facility," prepared for Alberta Innovates—Energy and Environment Solutions, Jul. 2015, 77 pages.

International Search Report and Written Opinion dated Feb. 21, 2017, issued in International Application No. PCT/CA2016/051408, filed Dec. 1, 2016, 9 pages.

Hisato, A., "Upgrading of Heavy Crude Oil—Supercritical Water Cracking Technology," JOGMEC Techno Forum 2014, Nov. 26-27, 2014, 27 pages.

Hill, R., et al., "Application of Molten Carbonate Fuel Cell for CO2 Capture in Thermal In Situ Oil Sands Facilities," International Journal of Greenhouse Gas Control 41:276-284, 2015.

Hamelinck, C.N., et al., "Potential for CO2 Sequestration and Enhanced Coalbed Methane Production in the Netherlands," NOVEM Programme No. 234.1, Mar. 2001 (ISBN 90-5847-020-4), 105 pages.

UPGRADING OIL USING SUPERCRITICAL FLUIDS

FIELD

This relates to a method that processes oil, such as crude oil and other hydrocarbon streams, with supercritical fluids produced from a waste stream of a fuel cell. The process recovers the anode fuel cell exhaust stream components and its thermal energy to produce supercritical streams of carbon dioxide and water.

BACKGROUND

Heavy oil and bitumen have high viscosities and high densities. The use of supercritical water to upgrade high viscosity, high density crude oils, has been developed by others. The advantage of supercritical water processes over traditional upgrading processes provides a method to upgrade heavy oils without the need for an external supply of hydrogen or catalysts. These developed supercritical water processes differ from each other by; process orientation, reactor design, residence time, operating conditions, addition of catalysts, promotors and or agents to enhance the upgrading of crude oil.

SUMMARY

Of all the developed crude oil upgrading supercritical water processes none of them recover and produce supercritical fluids from a waste stream to upgrade crude oil. Unlike the other developed upgrading processes, the recovered and produced carbon dioxide and water is used to first upgrade the produced oil and then to enhance oil recovery at the oil reservoir. These supercritical fluids are produced from a power generation process waste stream (the fuel cell anode exhaust stream) which is typically discharged to the atmosphere. This exhaust stream also provides the thermal energy required first to produce the supercritical fluid and then to upgrade the crude oil. The invention provides significant improvements on the consumption of energy and reduction in GHG emissions for crude oil upgrading.

The invention discloses a method to upgrade crude oil that meet or exceed pipeline transportation specifications of viscosity and density, eliminating the need of hydrocarbon condensate addition. The disclosed invention uses supercritical fluids to process crude oils and hydrocarbon streams. The supercritical fluids are produced from a waste stream, the fuel cell anode exhaust stream components and its thermal energy. The use and recovery of a fuel cell anode exhaust stream components and its thermal energy is a novel idea to produce supercritical fluids for processing crude oils and hydrocarbon streams.

The disclosed invention provides a method to upgrade crude oil with supercritical fluids produced from a waste stream. The process recovers the anode exhaust stream and its thermal energy from a power generation natural gas fuel cell to produce two streams; a supercritical water stream and a supercritical carbon dioxide stream.

The process of generating power with a natural gas fuel cell differs from standard power generation plants that consume natural gas. In a fuel cell, natural gas is consumed at the anode by an electrochemical reaction that produces electricity and a hot exhaust stream of gases, mainly water vapor and carbon dioxide. The standard power generation processes combust natural gas to produce electricity and a large hot exhaust gas stream, mainly nitrogen oxides.

The proposed invention discloses a method to produce supercritical fluids from a fuel cell waste stream to upgrade crude oil. In addition unused supercritical fluids and waste heat streams from the upgrading process are re-injected into an oil reservoir to enhance oil production.

According to an aspect, features of the process may include: power generation by chemical reaction of methane in a fuel cell at an oil production field; no GHG emissions, the fuel cell anode exhaust stream and its thermal energy is fully recovered to produce supercritical fluids; production of supercritical water, the anode chemical reaction of hydrogen with oxygen by stoichiometry produces 2.25 Kg of water per Kg of methane; production of supercritical carbon dioxide, the anode chemical reaction of carbon with oxygen by stoichiometry produces 2.75 Kg of carbon dioxide per Kg of methane; the use of produced supercritical fluids to upgrade crude oil and enhance oil production; and reduction in energy consumption and GHG emissions to upgrade crude oil and enhance oil production. Other features will be apparent to those skilled in the art, and may depend on the specific embodiment.

In one aspect, the process produces electricity from a fuel cell and recovers its anode exhaust stream and its thermal energy to produce supercritical fluids to upgrade crude oil and enhance oil production.

In a further aspect, the process for the upgrading of crude oil and enhancement of oil production at an oil field comprises:

a. First, reducing the natural gas pressure supply to the fuel cell anode through an expander generator, producing electricity and a refrigerant natural gas stream.
b. Second, the refrigerant natural gas fuel cell anode supply stream enters a heat exchanger in a counter-current flow with the gaseous anode exhaust stream to cool and condense carbon dioxide.
c. Third, the fuel cell anode natural gas supply stream exits the counter-current heat exchanger and is further heated in another counter-current heat exchanger by the cathode exhaust gaseous stream.
d. Fourth, the heated natural gas supply stream enters the fuel cell anode where it is converted by steam reforming and electrochemical reactions into electricity and a high temperature anode exhaust gas stream of mainly carbon dioxide and water.
e. Fifth, route a portion of the recovered water to produce steam in a counter-current flow heat exchanger with the cathode exhaust gas stream to supply steam reformer at the anode.
f. Sixth, the gaseous carbon dioxide stream from the carbon dioxide separator is mixed with fresh air and catalysed in a catalytic oxidizer to heat this oxidant stream up to fuel cell cathode temperature. The cathode consumes oxygen from the air and the carbon dioxide to produce a carbonate ion that is transferred through the fuel cell electrolyte layer to the anode to react with the anode hydrogen producing; water, carbon dioxide and electricity.
g. Seventh, the high temperature anode exhaust gas stream is pre-cooled in a counter-current flow heat exchanger with the recovered water.
h. Eighth, anode exhaust gas stream is further cooled in a counter-current flow heat exchanger with the recovered carbon dioxide to condense the water fraction of the anode exhaust gas stream.
i. Ninth, recover the condensed water fraction of the anode exhaust gas stream in a gas/liquid separator and route the separated anode exhaust gaseous carbon dioxide stream for further cooling in a counter-current heat exchanger with the recovered liquid carbon dioxide stream.
j. Tenth, further cool the anode exhaust gaseous carbon dioxide stream in a counter-current heat exchanger with a cold carbon dioxide gaseous stream.
k. Eleventh, further cool the anode exhaust gaseous carbon dioxide stream in a counter-current heat exchanger with the fuel cell anode refrigerant natural gas supply stream to condense the carbon dioxide.
l. Twelfth, pump to supercritical pressure the recovered liquid carbon dioxide stream and heat exchange in a counter-current flow with the anode exhaust stream to required supercritical temperature.
m. Thirteenth, route a slipstream of supercritical carbon dioxide and increase the pressure to mix with crude oil to a desired density.
n. Fourteenth, route the remaining supercritical carbon dioxide to the oil reservoir.
o. Fifteenth, pump to supercritical pressure the recovered water stream and heat exchange in a counter-current flow with the anode exhaust stream to required supercritical temperature.
p. Sixteenth, route the supercritical water into three streams to mix with density controlled crude oil. The supercritical water streams are routed through heat exchangers and mixers to heat the crude oil in increments before entering the reactor.
q. Seventeenth, route the remaining supercritical water to the oil reservoir.
r. Eighteenth, route the heated mixture of crude oil, supercritical carbon dioxide and supercritical water into a once through reactor.
s. Nineteenth, route the oil produced separated water to a heat exchanger to cool the reactor overhead stream, where a slipstream of the oil produced water is routed to an in-line mixer to control oil/water ratio to the reactor and the balance is injected it into the oil reservoir.
t. Twentieth, depressurize the pre-cooled reactor overhead stream into a three phase separator; gaseous stream to fuel gas header, upgraded oil stream to storage and water stream for re-injection into oil reservoir.
u. Twenty-first, route surplus gaseous streams into a fuel gas header for users and the balance to oil reservoir by compression.
v. Twenty-second, route the reservoir oil production stream and flash it into a three phase separator to produce; a gaseous stream, a crude oil stream and a water stream.

The process may be used to upgrade crude oil and enhance oil field production by first recovering the water and carbon dioxide from a fuel cell anode exhaust stream; second, pressurizing the condensed carbon dioxide and water and heating them in counter-current heat exchangers to produce supercritical fluids; third, mixing the supercritical fluids with produced oil to upgrade it to pipeline transport specifications in a reactor; and fourth, injecting remaining supercritical fluids and process waste heat streams to oil reservoir to enhance oil production.

The process recovers a fuel cell waste stream to produce supercritical fluids and uses these supercritical fluids to upgrade the produced crude oil. The remaining supercritical fluids and thermal process waste streams are injected into the oil reservoir to enhance oil production.

The process produces supercritical fluids from a waste stream to upgrade crude oil, enhance oil production, and substantially reduce these oil processes environmental footprint.

The method of producing supercritical fluids may be applied to process crude oils and hydrocarbon streams where thermal energy and/or solvents are required for hydrocarbons processing.

According to an aspect, there is provided a method of using an exhaust stream to condense, recover, pump and re-heat a fuel cell anode exhaust stream composed mainly of water vapour and carbon dioxide to produce supercritical fluids for the processing of a hydrocarbon stream, comprising crude oil, distillation column bottoms, production and/or processed streams, the method comprising the steps of: operating the fuel cell to generate an anode exhaust stream comprising water vapour and carbon dioxide; condensing and separating water from the anode exhaust stream to produce a stream of water and a stream of carbon dioxide; heating a first portion of the stream of water to produce a stream of steam; combining the stream of steam and the fuel to form the anode input stream; heating and pressurizing at least a portion of the stream of water to a supercritical pressure and temperature; heating and pressurizing a second portion of the stream of water to a supercritical pressure and temperature; reducing the specific gravity of the hydrocarbon stream by mixing the supercritical carbon dioxide stream with the hydrocarbon stream; achieving a desired oil/water ratio by mixing the supercritical water stream with the hydrocarbon stream; and upgrading a mixture of the hydrocarbon stream supercritical carbon dioxide and supercritical water stream in a reaction vessel.

According to further aspects, the method may comprise one or more of the following features, alone or in combination. The hydrocarbon stream may be produced oil from a hydrocarbon producing formation, the hydrocarbon stream is stored crude oils, or the hydrocarbon stream may be a bottom stream from a distillation column. A portion of at least one of the supercritical carbon dioxide and the supercritical water may be injected in a well in a hydrocarbon producing formation. The supercritical water may be used to heat a feed stream to the distillation tower. The supercritical water may be used to heat the hydrocarbon stream. The supercritical water may be used to heat the hydrocarbon stream in a heat exchanger before being mixed with the hydrocarbon stream upstream of the heat exchanger to control thermal cracking. Supercritical water may be used to heat the hydrocarbon stream in a heat exchanger before being mixed with the hydrocarbon stream upstream of the heat exchanger in a sequence to control thermal cracking. The reaction vessel may comprise an upflow thermal cracking reactor that ensures a minimum residence time by pressure control. The temperature of the supercritical water in the reaction vessel may be controlled by controlling the pressurized water flowrate through heat exchangers that heat the stream of water from the anode exhaust stream. A produced water fraction may be separated from the produced oil, and the produced water fraction may be heated and injected into an injection well in the hydrocarbon producing formation. A produced gaseous fraction may be separated from the produced oil, and the produced gaseous fraction may be consumed in plant and the balance compressed into an injection well in the hydrocarbon producing formation. A recovered water fraction may be separated from the upgraded oil and added to control the oil/water ratio upstream of the reactor and the balance injected into an injection well in the hydrocarbon producing formation. An upgrader gaseous fraction may be separated from the upgraded oil and at least a portion of the upgrader gaseous fraction may be compressed into an injection well in the hydrocarbon producing formation.

According to another aspect, there is provided a method of upgrading a hydrocarbon stream from a hydrocarbon source, the method comprising the steps of: operating a fuel cell to generate a waste stream comprising carbon dioxide and water, and separating the waste stream into a carbon dioxide stream and a water stream; controlling the pressure and temperature of the carbon dioxide stream and the water stream to generate a supercritical carbon dioxide stream and a supercritical water stream; reducing the specific gravity of the hydrocarbon stream by mixing the supercritical carbon dioxide stream with the hydrocarbon stream; achieving a desired oil/water ratio by mixing the supercritical water stream with the hydrocarbon stream; and upgrading the hydrocarbon stream that is mixed with supercritical carbon dioxide and supercritical water stream in a reaction vessel.

According to further aspects, the method may comprise one or more of the following features, alone or in combination. The hydrocarbon source may be a well in a hydrocarbon producing formation, and at least a portion of the supercritical carbon dioxide may be injected into the hydrocarbon well to mix with the hydrocarbon stream. The hydrocarbon source may be a crude oil storage facility. The hydrocarbon source may be a bottom stream from a refinery distillation column. The fuel cell may be powered by a source of natural gas or other hydrocarbon fuel sources and the fuel cell may be a carbonate fuel cell. The hydrocarbon stream may be mixed with supercritical carbon dioxide stream. The hydrocarbon stream may be heated and mixed with the supercritical water stream in incremental stages. The supercritical water may heat the hydrocarbon stream in one or more heat exchangers prior to mixing with the hydrocarbon stream, and the supercritical water may be mixed with the hydrocarbon stream upstream of the one or more heat exchangers. The upgraded hydrocarbons may be separated into a gas stream, an upgraded oil stream, and a recovered water stream. The recovered water stream may be heated and pressurized to generate a recovered supercritical water stream. The recovered supercritical water stream may be mixed with the hydrocarbon stream. The oil/water ratio may be controlled by controlling the amount of recovered supercritical water stream that is mixed with the hydrocarbon stream. The reaction vessel may comprise an upflow thermal cracking reactor that ensures a minimum residence time by pressure control. The temperature of the supercritical water in the reaction vessel may be controlled by controlling the pressurized water flowrate through heat exchangers that heat the stream of water from the anode exhaust stream. A produced water fraction may be separated from fluid produced from the hydrocarbon producing formation, and the produced water fraction may be heated and injected into an injection well in the hydrocarbon producing formation. A produced gaseous fraction may be separated from fluid produced from the hydrocarbon producing formation, and the produced gaseous fraction may be compressed into an injection well in the hydrocarbon producing formation. A recovered water stream may be separated from the upgraded hydrocarbons and at least a portion of the recovered water stream may be injected into an injection well in the hydrocarbon producing formation. A gas stream may be separated from the upgraded hydrocarbons and at least a portion of the gas stream may be compressed into an injection well in the hydrocarbon producing formation.

The above described method was developed with a view to process hydrocarbons by using supercritical fluids produced from a waste stream. The process added benefit is the injection of remaining supercritical fluids and process waste heat streams thermal energy to enhance oil production at a reservoir.

As will hereinafter be further described, supercritical fluids are produced from a waste stream to process crude oil and provide thermal energy to an oil reservoir. The process includes a natural gas supply stream to a fuel cell, first reducing the natural gas pressure through a gas expander/generator producing a refrigerant natural gas stream and electricity. The refrigerant natural gas stream is pre-heated in a counter-current heat exchanger with a separated anode exhaust gaseous stream to condense and produce liquid carbon dioxide. The heated fuel cell natural gas stream is further heated and fed to the fuel cell anode where first it is steam reformed to produce hydrogen and carbon dioxide, the hydrogen is further reacted with a carbonate ion to produce water, carbon dioxide and electricity. The anode hot exhaust gas stream, is cooled, condensed, separated, recovered, pressurized and re-heated to produce supercritical fluids for the upgrading of crude oil and injection into an oil reservoir to heat and reduce oil viscosity and density for the enhancement of oil production. The current industry practices of oil production use steam generated from natural bodies of water and or imported solvents to enhance oil production. The objective of the inventive process is first, to recover a fuel cell anode exhaust stream and its thermal energy to produce supercritical fluids, second to upgrade the produced crude oil with the supercritical fluids and third to enhance oil production with the recovered thermal energy and solvents.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The method will now be described with reference to FIG. 1.

This present method was developed with a view to producing supercritical fluids from a fuel cell anode exhaust stream to upgrade crude oil and supply thermal energy and supercritical fluids to an oil reservoir. The process utilizes a different approach to producing supercritical fluids for crude oil upgrading and enhancement of oil production. The system described herein takes advantage of recovering a fuel cell anode concentrated hot exhaust gas stream to produce supercritical fluids.

In the presently described process, the recovered fuel cell anode exhaust gas stream of water and carbon dioxide are recovered to produce supercritical fluids. These are used to first upgrade the produced crude oil, and the waste streams from the upgrading process may then be injected into the oil reservoir to enhance oil production. The way in which the method is applied as described below should, therefore, be considered as an example.

As is known in the art, supercritical water is a fluid state of water and is achieved when water is held at or above its critical pressure and temperature, such as a critical pressure of 22.06 MPa and a critical temperature of 375° C. Supercritical carbon dioxide is a fluid state of carbon dioxide that is achieved when it is held at or above its critical pressure and temperature, such as a critical pressure of 7.39 MPa and a critical temperature of 32° C. Fuel cells such as, the Direct Fuel Cell (DFC) manufactured by Fuel Cell Energy in the USA, have been available since 2003. The largest DFC power generation plant is 59 MW. A major advantage of a DFC power generation plant versus standard combustion power generation plants is the smaller mass flow rate of the anode exhaust gas stream with a high concentration of carbon dioxide and water, allowing for ease of recovery and use.

Figure 1:
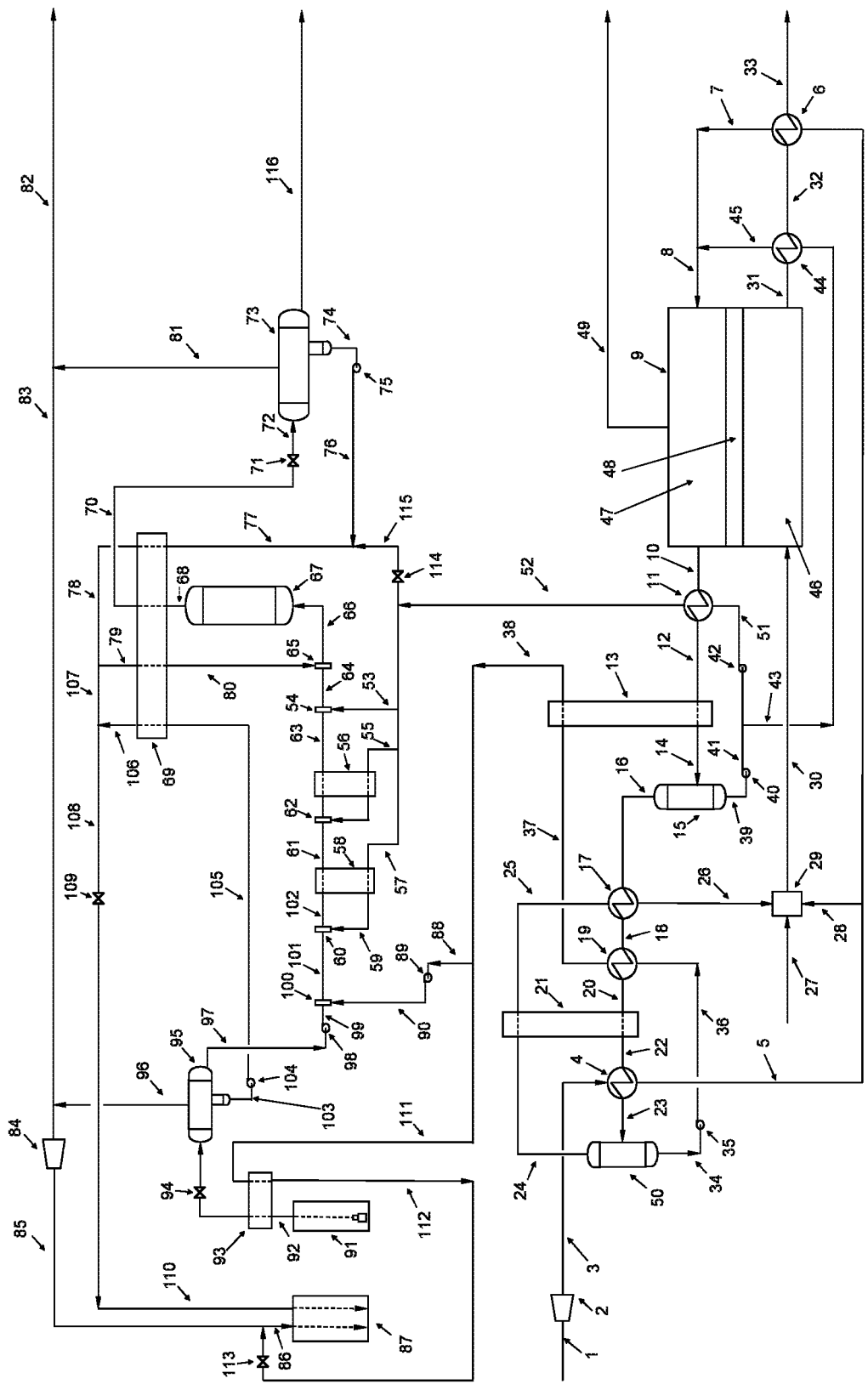
FIG. 1 is a schematic diagram of a crude oil upgrading process at an oil production site with supercritical fluids produced from a fuel cell anode exhaust stream.

Referring to FIG. 1, an example of the process for recovering a fuel cell anode exhaust stream of water and carbon dioxide to produce supercritical fluids is shown. To produce the supercritical fluids, natural gas is first delivered from a main transmission pipeline through stream 1 and enters an expander/generator 2 to reduce the main transmission pipeline pressure to meet fuel cell inlet pressure stream 3. In general, the temperature of stream 3 will decrease by 1.5-2° C. for every 15 psi pressure drop. The cooler natural gas stream 3 enters heat exchanger 4 to give up its coolth to stream 22. A portion of natural gas stream 5 is routed through stream 28 to provide gas to air pre-heater 29, and the balance of stream 5 is further heated in heat exchanger 6 by fuel cell cathode exhaust stream 32. The heated fuel cell gas stream 7 is mixed with steam from stream 45, and enters the fuel cell 9 at anode section 47 through stream 8. At fuel cell anode 47, the natural gas/steam stream 8 is first reformed to produce hydrogen and carbon dioxide. Hydrogen is produced through an electrochemical reaction with a carbonate ion produced in cathode 46 and transferred through an electrolyte layer 48 to the anode 47. The carbonate ion produced in cathode 46 and transferred through electrolyte layer 48 into anode 47 is converted back to carbon dioxide in the electrochemical reaction. The products of anode 47 are an electricity stream 49, and a hot anode exhaust stream 10. The main components of the hot anode exhaust stream 10 are steam and carbon dioxide, with some residual hydrogen. The hot anode exhaust stream 10 enters heat exchanger 11 to give up some of its heat to water stream 51, and the cooler anode exhaust stream 12 is further cooled in heat exchanger 13 to give up more of its heat to carbon dioxide stream 37. The further cooled anode exhaust stream 14 enters separator 15 to separate and collect the condensed water component of the anode exhaust stream 14. The concentrated carbon dioxide anode exhaust stream 16 exits separator 15 and is further cooled in heat exchanger 17 by carbon dioxide stream 25. The colder concentrated carbon dioxide anode exhaust 18 is further cooled in heat exchanger 19 by liquid carbon dioxide stream 36 and further cooled in heat exchanger 21 by carbon dioxide stream 24, followed by yet more cooling in heat exchanger 4 by natural gas stream 3. The cold concentrated carbon dioxide anode exhaust stream 23 enters carbon dioxide separator 50 where the condensed carbon dioxide is separated from the gaseous carbon dioxide and residual hydrogen. The gaseous cold carbon dioxide stream and residual hydrogen stream 24 enters heat exchanger 21 to give up some of its coolth to anode exhaust stream 20, the warmer stream 25 is further heated in heat exchanger 17 by anode exhaust stream 16, the heated gaseous carbon dioxide and residual hydrogen stream 26 is mixed with air stream 27 at air pre-heater 29 where the residual hydrogen is catalytically oxidized and the oxidant stream 30 is heated to cathode 46 temperature. The fuel cell cathode 46 consumes the oxygen from the air and the circulated carbon dioxide from stream 26 to produce carbonate ion for transfer through electrolyte layer 48 to the fuel cell anode 47. The hot cathode exhaust stream, consisting mainly of nitrogen with residuals of carbon dioxide, water vapour and oxygen, exits fuel cell cathode 46 through stream 31 and enters heat exchanger 44 to heat water stream 43 and produce a steam stream 45 to mix with heated natural gas stream 7. The mixed stream 8 is fed to the fuel cell anode 47 reformer to produce hydrogen and carbon dioxide. The cathode exhaust stream 32 is further cooled in heat exchanger 6, heating fuel cell anode natural gas supply stream 5 and is exhausted into the atmosphere through stream 33. The recovered water exits separator 15 through stream 39 and pressurized by pump 40 into stream 41. A slipstream stream 43 is routed to heat exchanger 44 to produce steam for the fuel cell anode 47 reformer. The net water produced enters pump 42 and is pressurized to critical pressure. The pressurized water stream 51 enters heat exchanger 11 to heat the water to critical temperature and produce a supercritical water stream 52. The liquid carbon dioxide exits separator 50 through stream 34 and pumped to critical pressure by pump 35. The pressurized stream 36 is routed through heat exchanger 19 to give up its coolth, and the warmer carbon dioxide stream 37 is further heated in heat exchanger 13 to critical temperature to produce a supercritical carbon dioxide stream 38.

The produced supercritical fluid streams 38 and 52 are conditioned to the desired pressure and temperature conditions to be used in processing and upgrading produced crude oil stream 97. The optimum pressure and temperature may vary depending on the preferences of the user and the composition of the crude oil being upgraded. The supercritical carbon dioxide stream 38 is split into streams 88 and 111. The supercritical carbon dioxide stream 88 is further pressurized by pump 89 to match the pressure of the crude oil in stream 99. The pressurized supercritical carbon dioxide stream 90 enters in-line mixer 100 and mixes with crude oil stream 99 to produce a mixed stream 101. The objective of adding supercritical carbon dioxide to stream 99 is to control the density of stream 101. The supercritical carbon dioxide stream 111 is further heated in heat exchanger 93. Heated supercritical carbon dioxide stream 112 is controlled by valve 113 as it is routed into compressed stream 85, and the mixed stream 86 is injected into injection well 87.

The supercritical water stream 52 is split into streams 57 and 55 to pre-heat and mix with streams 101, 61 and 63 in a temperature increment to control thermal cracking. Supercritical water stream 57 is first routed through heat exchanger 58 to pre-heat mixed stream 101, and the cooler water stream 59 enters in-line mixer 60 to produce mixer stream 101. Supercritical water stream 55 is routed through heat exchanger 56 to pre-heat mixed stream 61 before entering in-line mixer 62. The supercritical water stream 53 is added to the preheated and premixed stream 63 through an in-line mixer 54 to provide additional heating. The heated, mixed stream 64 is a mixture of produced oil, supercritical carbon dioxide and supercritical water that has been heated and mixed in sequence, and is further mixed at in-line mixer 65 by a recycled supercritical water stream 80 to a desired water/oil ratio. This controlled oil/water ratio stream 66 enters reactor 67 under supercritical water conditions for a residence time sufficient to upgrade the crude oil. The reactor 67 may be any suitable type of reactor, one example of which is an upflow thermal cracking reactor. The residence time in reactor 67 is controlled by pressure reduction valve 71. The temperature requirement of the reactor for upgrading the crude oil is provided by controlling the supercritical water flowrate through heat exchanger 11. The single phase reaction product stream 68 is cooled in heat exchanger 69 in three steps; first by water stream 79, second by water stream 77, and third by water stream 105. The cooled product stream 70 is then depressurized by valve 71 and enters vessel 73 as a reaction product stream 72. Vessel 71 separates product stream 72 into gas stream 81, upgraded oil product stream 116 and water stream 74. The gas stream 81 enters fuel gas header 82 for use in the plant. Fuel gas stream 83 is routed to gas compressor 84 for compression and injection through stream 85 into injection well 87. The upgraded oil product stream 116 is routed to storage. The condensed water stream 74 is routed to pump 75, which pressurizes the water to the operating pressure of stream 64 and routed through stream 76 to stream 77 and further heated in heat exchanger 69. The pressurized and heated stream 78 is split into streams 79 and 107. The pressurized stream 79 is heated to supercritical water conditions at heat exchanger 69 and injected through stream 80 into in-line mixer 65 to meet the desired water/oil ratio in stream 66, before being injected into reactor 67.

Produced oil from well 91 is routed through stream 92 and cooled in heat exchanger 93 before flashing across valve 94 into separator 95. The flashed gaseous stream 96 is routed to fuel gas header 82. The separated water fraction is routed through stream 103 to pump 104 and pressurized in line 105 to the operating pressure of stream 107. The pressurized water stream 105 is routed to heat exchanger 69 for further heating. The pressurized, heated water stream 106 is then mixed with stream 107 into water stream 108, which is pressure controlled by valve 109 before being injected into well 87 through stream 110. The separated oil stream 97 is routed to pump 98 and pressurized to the supercritical water pressure to be mixed with supercritical carbon dioxide to control oil density and then to be mixed and heated in incremental steps with supercritical water to reach reaction conditions to upgrade the oil.

Alternatively, the supercritical water stream 52 may be routed through valve 114 and through stream 115 directly into injection well 87.

Some objectives of the process are to recover the concentrated water and carbon dioxide components of a fuel cell anode exhaust stream by condensation in counter current heat exchange process configuration; to convert the recovered liquids into supercritical fluids by pressurizing and re-heating in a counter current heat exchange process configuration; to use the supercritical fluids to upgrade the produced oil; and to inject the process produced gaseous and water streams into an oil reservoir to enhance oil production. The process benefits from the efficient recovery of components and thermal energy from a fuel cell anode exhaust stream at a power generation plant to produce supercritical fluids that are used to upgrade crude oil and enhance oil recovery at an oil reservoir.

In addition to the example given above, additional examples will now be described with reference to FIGS. 2 and 3.

Figure 2:
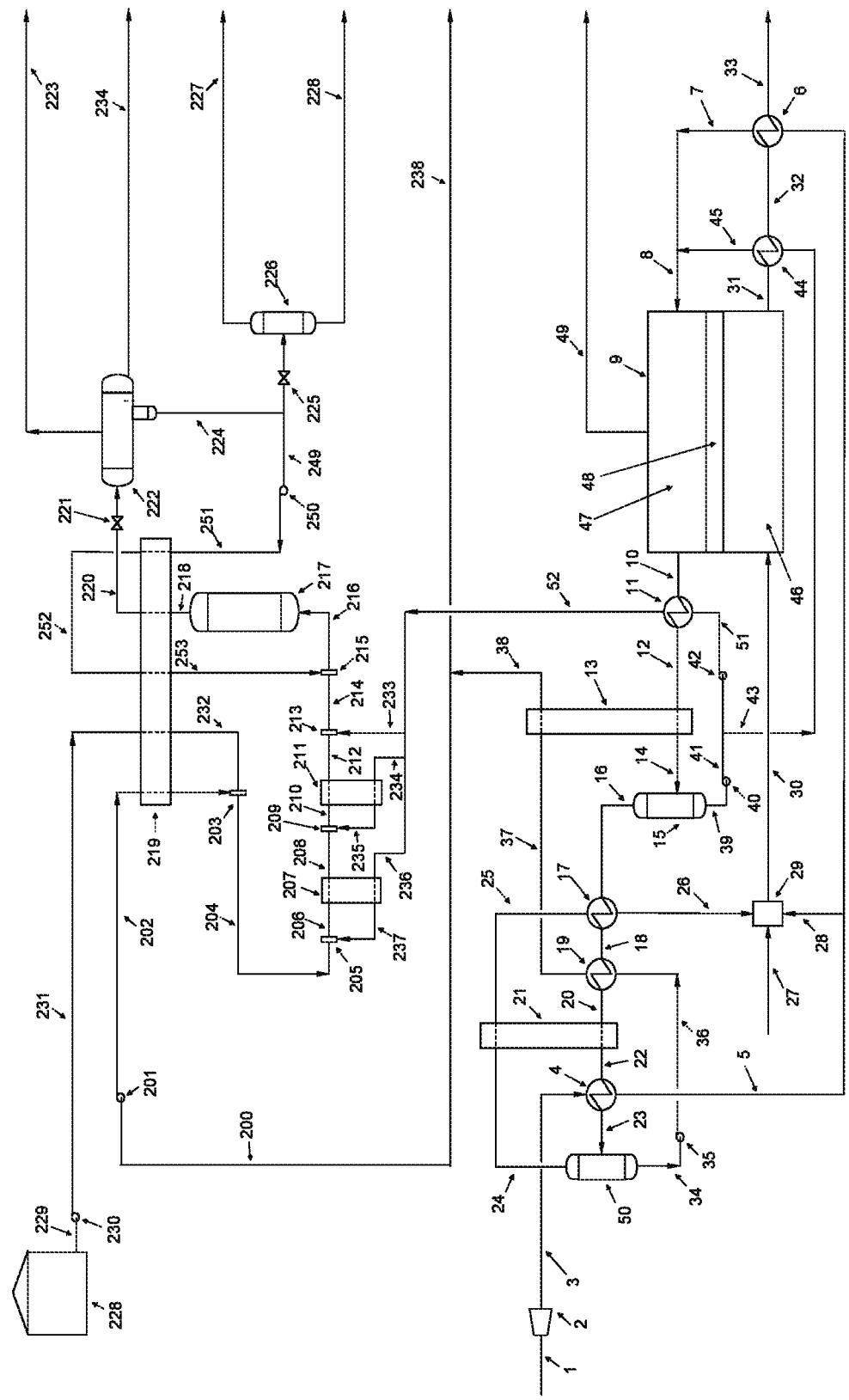
FIG. 2 is a schematic diagram of a crude oil upgrading process from oil storage.

Referring to FIG. 2, an alternative process arrangement is shown. The process in FIG. 3 differs from FIG. 1 with respect to the source and supply of crude oil. In FIG. 1, the crude oil supply was produced oil from a well. In FIG. 2, the crude oil supply is from storage.

The production of supercritical fluids from a fuel cell anode exhaust stream has been described in detail in FIG. 1. In FIG. 2, the crude oil is supplied from storage tank 228 and is routed through stream 229 to crude oil pump 230 where it is pressurized to supercritical water pressure. The pressurized crude oil stream 231 is pre-heated in heat exchanger 219, and the heated crude oil stream is mixed with supercritical carbon dioxide stream 202 at in-line mixer 203 to control the density of the crude oil. The density controlled crude oil stream 204 is further heated and mixed with supercritical water at in-line mixer 205. The mixture of crude oil, supercritical carbon dioxide and supercritical water stream 206 is further heated in heat exchanger 207. The heated mixture stream 208 is further mixed with additional supercritical water stream 235 at in-line mixer 209. The mixture stream 210 is further heated in heat exchanger 211, and the heated mixture stream 212 is further mixed and heated with supercritical water stream 233 at in-line mixer 213. A final mixture occurs between heated mixture stream 214 and supercritical water stream 233 at in-line mixer 215, which is used to control the oil/water ratio in stream 216 before being injected into the reaction vessel 217. The crude oil is mixed and heated with supercritical water in sequential increments in order to control condensation reactions. In the depicted embodiment, the mixture of produced oil, supercritical carbon dioxide and supercritical water that has been heated and mixed in sequence is routed through stream 216 into reactor 217 under supercritical water conditions for a residence time sufficient to upgrade the crude oil. The residence time in reactor 217 is controlled by pressure reduction valve 221. The temperature requirement of the reactor for upgrading the crude oil is provided by controlling the supercritical water flowrate through heat exchanger 11. The single phase reaction product stream 218 is cooled in heat exchanger 219 by crude oil stream 231, and the cooled product stream 220 is depressurized by valve 221 and enters vessel 222, where product stream 220 is separated into gas stream 223, upgraded oil product stream 234 and water stream 224. The gas stream 223 is routed to the fuel gas header for use in the plant. The upgraded oil product stream 234 is routed to storage. The condensed water stream 224 is divided into two streams. One stream is routed to valve 225, and de-pressurized and flashed at separator 226 to produce low pressure steam, with stream 227 being routed to a low pressure steam header (not shown) and the condensed water stream 228 routed to a waste water API pond (not shown). A second stream is routed via stream 229 to a pump 230 where the water is pressurized to the working pressure of stream 214. The water is heated to supercritical conditions in line 233 as it passes through heat exchanger 219, stream 232, and again through heat exchanger 219.

The produced supercritical fluid streams 38 and 52 are conditioned to the optimum pressure and temperature conditions for the processing and upgrading of produced crude oil stream 232. The supercritical carbon dioxide stream 38 is split into streams 200 and 238. The supercritical carbon dioxide stream 200 is further pressurized by pump 201 to crude oil stream 232 pressure. The pressurized supercritical carbon dioxide stream 202 further heated in heat exchanger 217 before entering in-line mixer 203 and mixes with crude oil stream 232 to produce a mixed stream 204. The objective of adding supercritical carbon dioxide to stream 232 is to control stream 204 density. The supercritical carbon dioxide stream 238 is routed to storage.

The supercritical water stream 52 is split into streams 236 and 234 to pre-heat and mix with streams 204 and 208 in a temperature increment to control thermal cracking. Supercritical water stream 236 is first routed through heat exchanger 207 to pre-heat mixed stream 206, the cooler stream 237 enters in-line mixer 205 to produce mixer stream 206. Supercritical water stream 234 is routed through heat exchanger 211 to pre-heat mixed stream 210 before entering in-line mixer 209 through stream 235. The supercritical water stream 233 is added to the preheated and premixed stream 212 through an in-line mixer 213 to a desired water/crude oil ratio to control condensation reactions.

The process in FIG. 2 may be used to upgrade crude oils from storage. The above described process can be applied at an oil battery or at a front end of a refinery to condition a slate of crude oils to meet refinery front end design parameters. Furthermore, the described process can also be applied at an oil battery to condition a crude oil to meet transport pipeline specifications.

Figure 3:
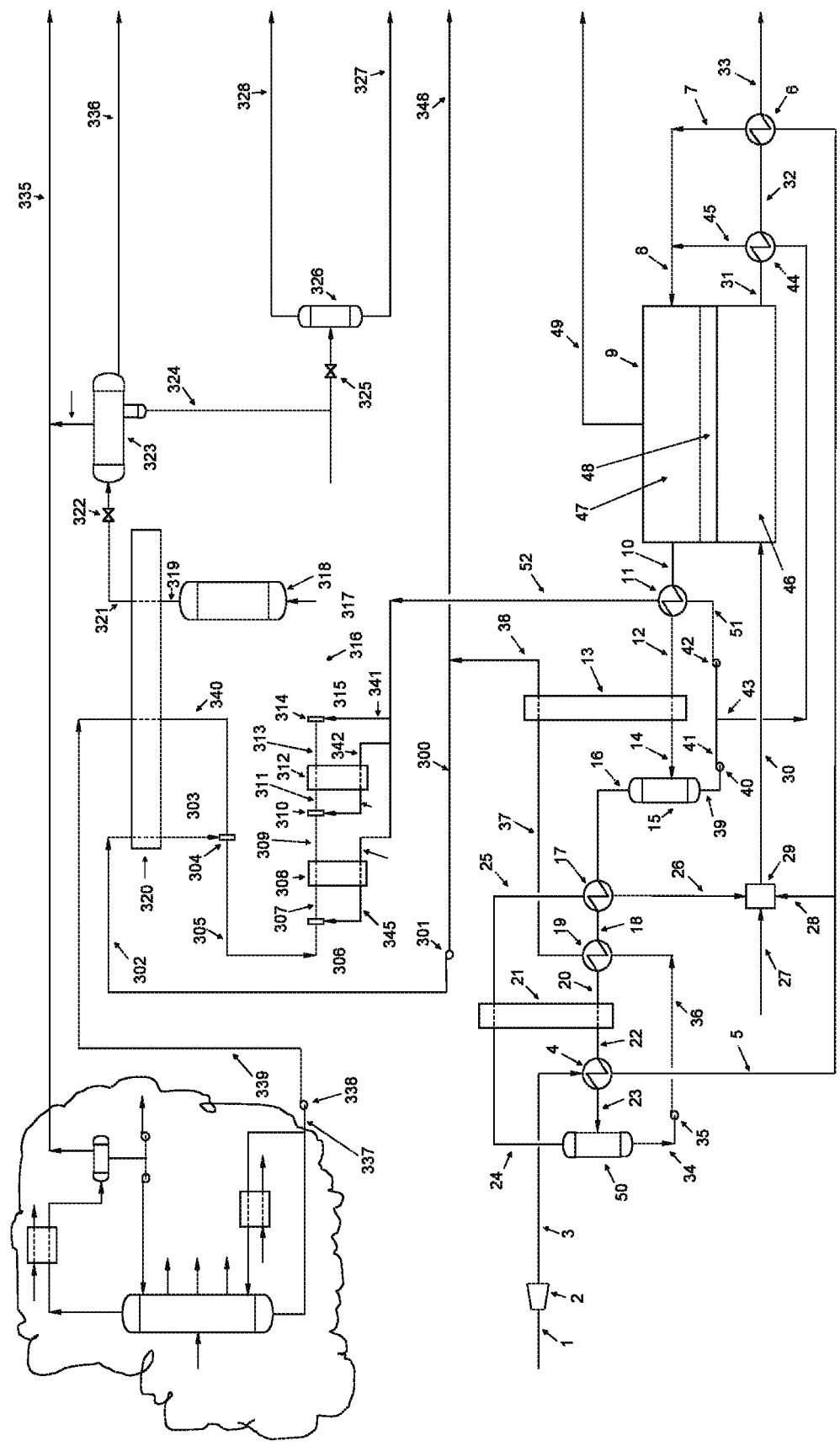
FIG. 3 is a schematic diagram of upgrading a refinery distillation column bottoms with supercritical fluids.

Referring to FIG. 3, another alternative is shown. The process in FIG. 3 differs from FIG. 2 with respect to its use in the refining processes. Whereas the process in FIG. 2 is applicable to the front end of a refinery, FIG. 3 is applicable to processes downstream of a crude distillation column, be it an atmospheric or vacuum distillation column. The production of supercritical fluids from a fuel cell anode exhaust stream was previously described in detail with respect to FIG. 1. In FIG. 3, a typical distillation column is shown within a cloud for reference only to the feed source. In FIG. 3, the distillation column bottoms stream 337 is routed to bottoms pump 338 where it is pressurized to supercritical water pressure. The pressurized bottoms stream 339 is first pre-heated in heat exchanger 320, and the heated bottoms stream 340 is mixed with supercritical carbon dioxide stream 303 at in-line mixer 303 to control bottoms oil density. The density controlled bottoms stream 305 is further heated and mixed with supercritical water at in-line mixer 306. The mixture of bottoms oil, supercritical carbon dioxide and supercritical water stream 345 is further heated in heat exchanger 308. The heated mixture stream 309 is further mixed with additional supercritical water stream 343 at in-line mixer 310. The mixture stream 311 is further heated in heat exchanger 312, and the heated mixture stream 313 is further mixed and heated with supercritical water stream 341 at in-line mixer 314. The bottoms oil is mixed with supercritical water in sequential increments in order to control condensation reactions. A final mixture occurs between heated mixture stream 315 and supercritical water stream 333 at in-line mixer 316, which is used to control the oil/water ratio in stream 317 before being injected into the reaction vessel 318. The mixture of bottoms oil, supercritical carbon dioxide and supercritical water, heated and mixed in sequence, is routed into reactor 318 under supercritical water conditions for a residence time sufficient to upgrade the bottoms oil. The residence time in reactor 318 is controlled by pressure reduction valve 322. The temperature requirement of the reactor for upgrading the bottoms oil is provided by controlling the supercritical water flowrate through heat exchanger 11. The single phase reaction product stream 319 is cooled in heat exchanger 320 first by recycled water stream 321, second, by stream 332 heated to supercritical conditions and third by bottoms oil stream 339. The cooled product stream 321 is depressurized by valve 322 and enters vessel 323 that separates the fluid into gas stream 334, upgraded oil product stream 336 and water stream 324. The gas stream 334 is routed to fuel gas header 335 for use in the plant. The upgraded oil product stream 336 is routed to other units or storage. The condensed water stream 324 is divided into two streams. One stream is routed to valve 325, depressurized and flashed at separator 326 to produce low pressure steam stream 328, which is routed to a low pressure steam header (not shown). The condensed water stream 327 is routed a waste water API pond (not shown). A second stream is routed through stream 329 to a pump 330 where it is pressurized to match the fluid pressure in stream 315. The pressurized water stream 331 is then heated in heat exchanger 320 twice as it passes through stream 332 to stream 33 to reach a supercritical state before being mixed with stream 315 in mixer 316 to a controlled oil/water ratio.

In the depicted embodiment, the produced supercritical fluid streams 38 and 52 are conditioned to the optimum pressure and temperature conditions for the processing and upgrading of bottoms stream 340. The supercritical carbon dioxide stream 38 is split into streams 300 and 338. The supercritical carbon dioxide stream 300 is further pressurized by pump 301 to match the pressure of bottoms oil stream 340. The pressurized supercritical carbon dioxide stream 302 is further heated in heat exchanger 320 before entering in-line mixer 304 via line 303. The heated stream of carbon dioxide 303 is then mixed with crude oil stream 340 to produce a mixed stream 305. The objective of adding supercritical carbon dioxide to stream 340 is to control the density in stream 305. The supercritical carbon dioxide stream 338 is routed to storage.

The supercritical water stream 52 is split into streams 344 and 342 to pre-heat and mix with streams 305 and 309 to increase the temperature incrementally to control thermal cracking. Supercritical water stream 344 is first routed through heat exchanger 308 to pre-heat mixed stream 307, while the cooler stream 345 enters in-line mixer 306 to heat and produce mixed stream 307. The supercritical water stream 342 is routed through heat exchanger 312 to pre-heat mixed stream 311 before entering in-line mixer 310 through stream 343. The supercritical water stream 341 is added to the preheated and premixed stream 313 through an in-line mixer 314 to provide additional heating. The heated, mixed stream 315 enters in-line mixer 31 where it is mixed with additional water from stream 333 to reach a desired supercritical water/bottoms oil ratio before being injected into reactor 318 in order to control condensation reactions.

The process in FIG. 3 is designed to use supercritical fluids to upgrade distillation column bottom streams to avoid or reduce the production of coke. These bottom streams are typically the heaviest and highest boiling point fractions of the barrel, which require higher operation severities to process. An advantage of producing supercritical fluids as proposed from a fuel cell anode exhaust stream is that temperatures of up to 1000° C. may be generated, such as in solid oxide fuel cells, and hence we are able to generate supercritical water to temperatures as required by the upgrading process. This feature of being able to generate supercritical fluids from a fuel cell anode exhaust stream at any desired pressure and to temperatures up to 1000° C. provides the ability to process streams that require high pressures and temperatures.

The examples depicted and described herein are based on a particular arrangement of components. It will be understood that modifications may be made while still achieving similar results, or to optimize or adapt the system to a particular set of circumstances. As one example, the number of mixing stages may be modified. As another example, another heat exchanger may be included after the reaction vessel to further cool the products. Other modifications will be apparent to those skilled in the art.

The process described herein is designed to recover the components and thermal energy from a fuel cell anode exhaust stream to produce supercritical fluids for the upgrading of crude oils and bottoms from refineries distillation columns. The use of these supercritical fluids can also be applied in other refining unit processes where solvents are employed to separate and treat hydrocarbon streams. Moreover, the use of supercritical water can also be employed to heat hydrocarbon streams in lieu of combustion furnaces.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A method of using an exhaust stream to condense, recover, pump and re-heat a fuel cell anode exhaust stream composed mainly of water vapour and carbon dioxide to produce supercritical fluids for the processing of a hydrocarbon stream, comprising crude oil, distillation column bottoms, or production streams, the method comprising:
   operating a fuel cell to generate an anode exhaust stream comprising water vapour and carbon dioxide;
   condensing and separating water from the anode exhaust stream to produce a stream of water and a stream of carbon dioxide;
   heating a first portion of the stream of water to produce a stream of steam;
   combining the stream of steam and a fuel stream to form an anode input stream;
   obtaining a supercritical carbon dioxide stream by heating and pressurizing at least a portion of the stream of carbon dioxide to a supercritical pressure and temperature;
   obtaining a supercritical water stream by heating and pressurizing a second portion of the stream of water to a supercritical pressure and temperature;
   reducing a density of the hydrocarbon stream by mixing the supercritical carbon dioxide stream with the hydrocarbon stream;
   achieving a desired oil/water ratio by mixing the supercritical water stream with the hydrocarbon stream; and
   obtaining an upgraded hydrocarbon stream by upgrading a mixture of the hydrocarbon stream, the supercritical carbon dioxide, and the supercritical water stream in a reaction vessel.

2. The method in claim 1, where the hydrocarbon stream is produced oil from a hydrocarbon producing formation.

3. The method of claim 2, where the supercritical water stream heats the hydrocarbon stream in a heat exchanger before being mixed with the hydrocarbon stream upstream of the heat exchanger to control thermal cracking.

4. The method of claim 2, where supercritical water stream heats the hydrocarbon stream in a heat exchanger before being mixed with the hydrocarbon stream upstream of the heat exchanger in a sequence to control thermal cracking.

5. The method of claim 2, wherein the reaction vessel comprises an upflow thermal cracking reactor that ensures a minimum residence time by pressure control.

6. The method of claim 2, wherein the reaction vessel comprises a thermal cracking reactor that ensures a minimum residence time by pressure control.

7. The method of claim 2, where the temperature of the supercritical water stream in the reaction vessel is controlled by controlling a pressurized water flowrate through heat exchangers that heat the stream of water from the anode exhaust stream.

8. The method of claim 2, where a produced water fraction is separated from the produced oil, and the produced water fraction is heated and injected into an injection well in the hydrocarbon producing formation.

9. The method of claim 2, where a produced gaseous fraction is separated from the produced oil, and the produced gaseous fraction is compressed into an injection well in the hydrocarbon producing formation.

10. The method of claim 2, where a recovered water fraction is separated from the upgraded hydrocarbon stream and at least a portion of the recovered water fraction is injected into an injection well in the hydrocarbon producing formation.

11. The method of claim 2, where an upgrader gaseous fraction is separated from the upgraded hydrocarbon stream and at least a portion of the upgrader gaseous fraction is compressed into an injection well in the hydrocarbon producing formation.

12. The method in claim 1, where the hydrocarbon stream is stored crude oils.

13. The method in claim 1, where the hydrocarbon stream is a bottom stream from a distillation column.

14. The method in claim 13, where the supercritical water stream is used to heat a feed stream to the distillation column.

15. The method in claim 1, where a portion of at least one of the supercritical carbon dioxide stream and the supercritical water stream is injected into a well in a hydrocarbon producing formation.

16. The method in claim 1, where the supercritical water stream is used to heat the hydrocarbon stream.

17. A method of upgrading a hydrocarbon stream from a hydrocarbon source, the method comprising the steps of:
   operating a fuel cell to generate a waste stream comprising carbon dioxide and water, and separating the waste stream into a carbon dioxide stream and a water stream;
   controlling a pressure and temperature of the carbon dioxide stream and the water stream to generate a supercritical carbon dioxide stream and a supercritical water stream;
   reducing a density of the hydrocarbon stream by mixing the supercritical carbon dioxide stream with the hydrocarbon stream;
   achieving a desired oil/water ratio by mixing the supercritical water stream with the hydrocarbon stream; and
   obtaining an upgraded hydrocarbon stream by upgrading the hydrocarbon stream that is mixed with the supercritical carbon dioxide stream and the supercritical water stream in a reaction vessel.

18. The method of claim 17, wherein the hydrocarbon source is a well in a hydrocarbon producing formation.

19. The method of claim 18, wherein the hydrocarbon source comprises a hydrocarbon well and at least a portion of the supercritical carbon dioxide stream is injected into the hydrocarbon well to mix with the hydrocarbon stream.

20. The method of claim 18, where a produced water fraction is separated from fluid produced from the hydrocarbon producing formation, and the produced water fraction is heated and injected into an injection well in the hydrocarbon producing formation.

21. The method of claim 18, where a produced gaseous fraction is separated from fluid produced from the hydrocarbon producing formation, and the produced gaseous fraction is compressed into an injection well in the hydrocarbon producing formation.

22. The method of claim 18, where a recovered water stream is separated from the upgraded hydrocarbon stream and at least a portion of the recovered water stream is injected into an injection well in the hydrocarbon producing formation.

23. The method of claim 18, where a gas stream is separated from the upgraded hydrocarbons and at least a portion of the gas stream is compressed into an injection well in the hydrocarbon producing formation.

24. The method of claim 17, wherein the hydrocarbon source is a crude oil storage facility.

25. The method of claim 17, wherein the hydrocarbon source is a bottom stream from a refinery distillation column.

26. The method of claim 17, wherein the fuel cell is powered by a source of natural gas.

27. The method of claim 26, wherein the fuel cell is a carbonate fuel cell.

28. The method of claim 17, wherein the hydrocarbon stream is heated and mixed with the supercritical water stream in incremental stages.

29. The method of claim 17, where the supercritical water stream heats the hydrocarbon stream in one or more heat exchangers prior to mixing with the hydrocarbon stream.

30. The method of claim 29, where the supercritical water stream is mixed with the hydrocarbon stream upstream of the one or more heat exchangers.

31. The method of claim 17, further comprising the step of separating the upgraded hydrocarbon stream into a gas stream, an upgraded oil stream, and a recovered water stream.

32. The method of claim 31, wherein the recovered water stream is heated and pressurized to generate a recovered supercritical water stream.

33. The method of claim 32, wherein the recovered supercritical water stream is mixed with the hydrocarbon stream.

34. The method of claim 33, wherein the oil/water ratio is controlled by controlling the amount of the recovered supercritical water stream that is mixed with the hydrocarbon stream.

35. The method of claim 17, wherein the reaction vessel comprises an upflow thermal cracking reactor that ensures a minimum residence time by pressure control.

36. The method of claim 17, where the temperature of the supercritical water in the reaction vessel is controlled by controlling a pressurized water flowrate through heat exchangers that heat the stream of water from the waste stream.

\* \* \* \* \*